(12) United States Patent
Raghavan et al.

(10) Patent No.: US 12,556,265 B2
(45) Date of Patent: Feb. 17, 2026

(54) GENERATING EFFECTIVE ISOTROPIC RADIATED POWER MASKS FOR INTERFERENCE MANAGEMENT

(71) Applicant: QUALCOMM Incorporated, San Diego, CA (US)

(72) Inventors: Vasanthan Raghavan, West Windsor Township, NJ (US); Mustafa Emara, Munich (DE); Marco Papaleo, Bologna (IT); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 18/319,957

(22) Filed: May 18, 2023

(65) Prior Publication Data

US 2024/0007180 A1    Jan. 4, 2024

Related U.S. Application Data

(60) Provisional application No. 63/367,290, filed on Jun. 29, 2022.

(51) Int. Cl.
*H04B 7/185*    (2006.01)
*H04B 7/06*    (2006.01)
*H04W 52/42*    (2009.01)

(52) U.S. Cl.
CPC ....... *H04B 7/18513* (2013.01); *H04B 7/0617* (2013.01); *H04W 52/42* (2013.01)

(58) Field of Classification Search
CPC . H04B 7/18513; H04B 7/0617; H04W 52/42; H04W 52/367
USPC .......................................................... 375/262
See application file for complete search history.

(56) References Cited

U.S. PATENT DOCUMENTS 10,320,471 B1 *    6/2019    Panthi ................ H04B 7/18513
2023/0344533 A1 *    10/2023    Wang ................... H04B 17/318

* cited by examiner

*Primary Examiner* — Fitwi Y Hailegiorgis
(74) *Attorney, Agent, or Firm* — QUALCOMM Incorporated

(57) ABSTRACT

Various aspects of the present disclosure generally relate to wireless communication. In some aspects, a network node may determine an effective isotropic radiated power (EIRP) limit for a communication to be transmitted by the network node, based at least in part on an EIRP mask and a spatial angle associated with the communication. The network node may transmit the communication in accordance with the EIRP limit. Numerous other aspects are described.

30 Claims, 10 Drawing Sheets

GENERATING EFFECTIVE ISOTROPIC RADIATED POWER MASKS FOR INTERFERENCE MANAGEMENT

CROSS-REFERENCE TO RELATED APPLICATION

This patent application claims priority to U.S. Provisional Patent Application No. 63/367,290, filed on Jun. 29, 2022, entitled "GENERATING EFFECTIVE ISOTROPIC RADIATED POWER MASKS FOR INTERFERENCE MANAGEMENT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for generating effective isotropic radiated power (EIRP) masks for interference management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a network node for wireless communication. The network node may include a memory and one or more processors coupled to the memory. The one or more processors may be configured to determine an effective isotropic radiated power (EIRP) limit for a communication to be transmitted by the network node, based at least in part on an EIRP mask and a spatial angle associated with the communication. The one or more processors may be configured to transmit the communication in accordance with the EIRP limit.

Some aspects described herein relate to a user equipment (UE) for wireless communication. The UE may include a memory and one or more processors coupled to the memory. The one or more processors may be configured to determine an EIRP limit for a communication to be transmitted by the UE, based at least in part on an EIRP mask for the UE and a spatial angle associated with the communication. The one or more processors may be configured to transmit the communication in accordance with the EIRP limit.

Some aspects described herein relate to a method of wireless communication performed by a network node. The method may include determining an EIRP limit for a communication to be transmitted by the network node, based at least in part on an EIRP mask and a spatial angle associated with the communication. The method may include transmitting the communication in accordance with the EIRP limit.

Some aspects described herein relate to a method of wireless communication performed by a UE. The method may include determining an EIRP limit for a communication to be transmitted by the UE, based at least in part on an EIRP mask for the UE and a spatial angle associated with the communication. The method may include transmitting the communication in accordance with the EIRP limit.

Some aspects described herein relate to a non-transitory computer-readable medium that stores a set of instructions for wireless communication by a network node. The set of instructions, when executed by one or more processors of the network node, may cause the network node to determine an EIRP limit for a communication to be transmitted by the network node, based at least in part on an EIRP mask and a spatial angle associated with the communication. The set of instructions, when executed by one or more processors of the network node, may cause the network node to transmit the communication in accordance with the EIRP limit.

Some aspects described herein relate to a non-transitory computer-readable medium that stores a set of instructions for wireless communication by a UE. The set of instructions, when executed by one or more processors of the UE, may cause the UE to determine an EIRP limit for a communication to be transmitted by the UE, based at least in part on an EIRP mask for the UE and a spatial angle associated with the communication. The set of instructions, when executed by one or more processors of the UE, may cause the UE to transmit the communication in accordance with the EIRP limit.

Some aspects described herein relate to an apparatus for wireless communication. The apparatus may include means for determining an EIRP limit for a communication to be transmitted by the apparatus, based at least in part on an EIRP mask and a spatial angle associated with the communication. The apparatus may include means for transmitting the communication in accordance with the EIRP limit.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
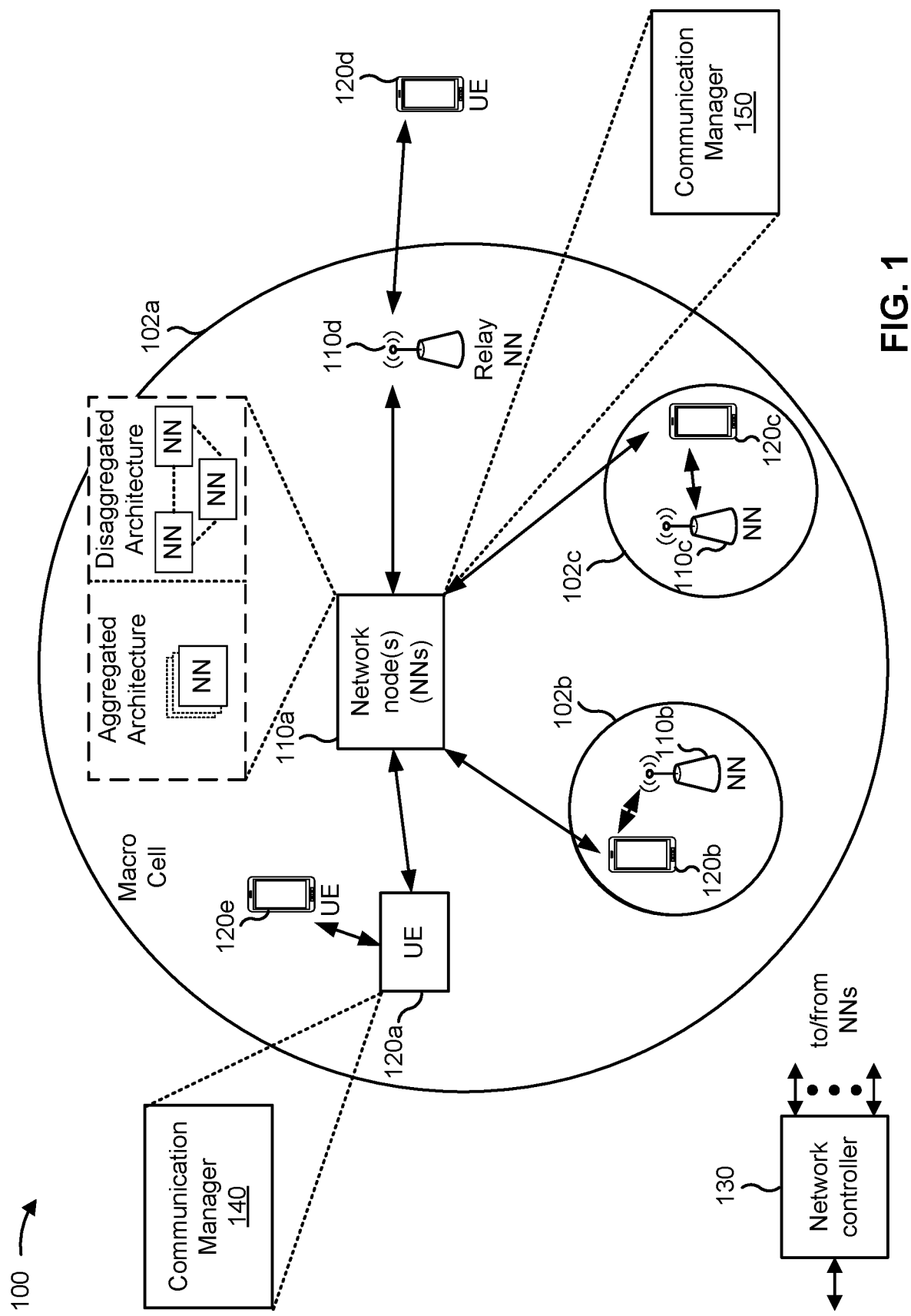
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node 110 may include a communication manager 150. As described in more detail elsewhere herein, the communication manager 150 may determine an effective isotropic radiated power (EIRP) limit for a communication to be transmitted by the network node, based at least in part on an EIRP mask and a spatial angle associated with the communication; and transmit the communication in accordance with the EIRP limit. Additionally, or alternatively, the communication manager 150 may perform one or more other operations described herein.

In some aspects, the UE 120 may include a communication manager 140. As described in more detail elsewhere herein, the communication manager 140 may determine an EIRP limit for a communication to be transmitted by the UE, based at least in part on an EIRP mask for the UE and a spatial angle associated with the communication; and transmit the communication in accordance with the EIRP limit. Additionally, or alternatively, the communication manager 140 may perform one or more other operations described herein.

As indicated above, FIG. 1 is provided as an example. Other examples may differ from what is described with regard to FIG. 1.

Figure 2:
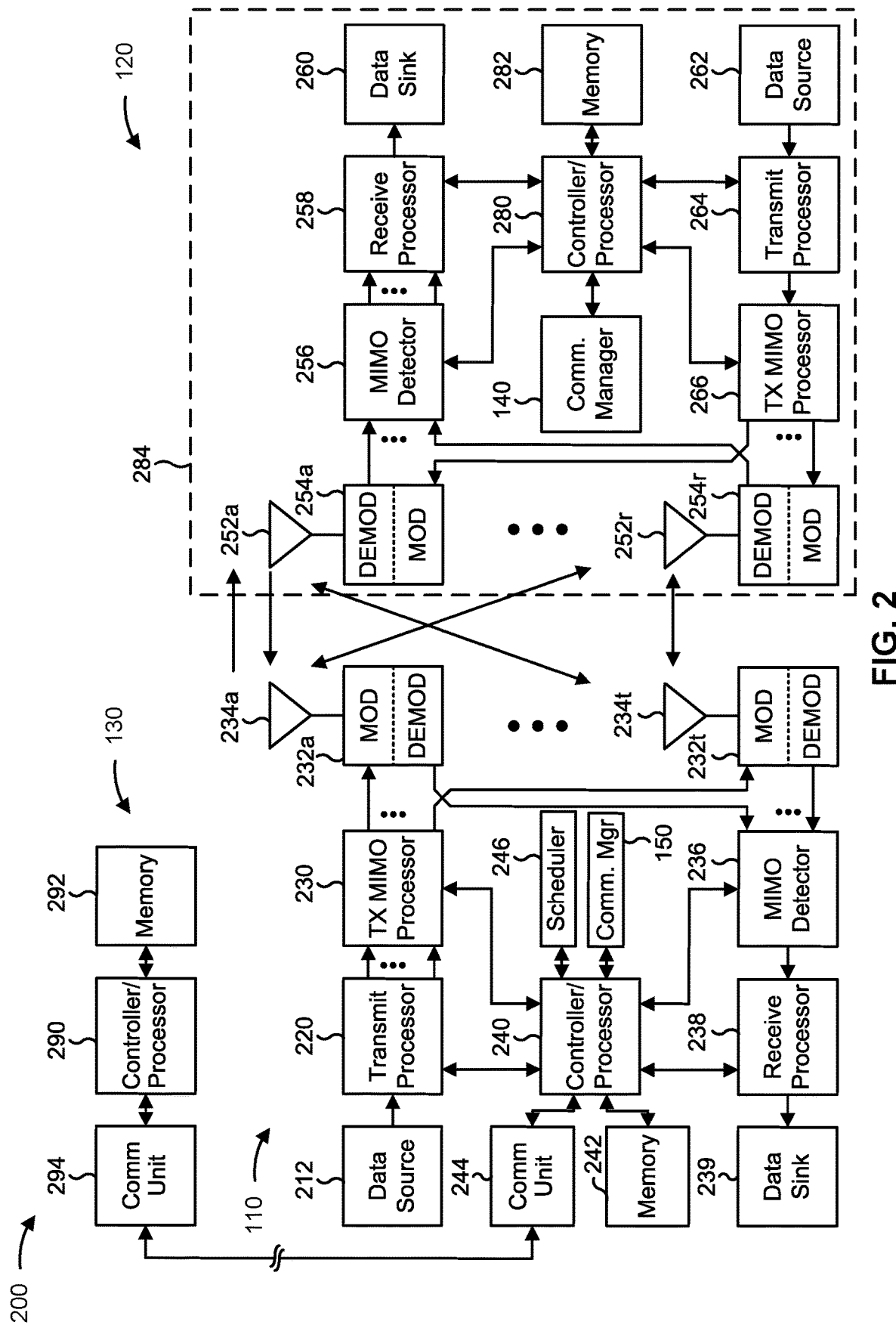
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCS s) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the network node 110, the controller/processor 280 of the UE 120, and/or any other component(s) of FIG. 2 may perform one or more techniques associated with generating EIRP masks for interference management, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a network node (e.g., the network node 110) includes means for determining an EIRP limit for a communication to be transmitted by the network node, based at least in part on an EIRP mask and a spatial angle associated with the communication; and/or means for transmitting the communication in accordance with the EIRP limit. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., the UE 120) includes means for determining an EIRP limit for a communication to be transmitted by the UE, based at least in part on an EIRP mask for the UE and a spatial angle associated with the communication; and/or means for transmitting the communication in accordance with the EIRP limit. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
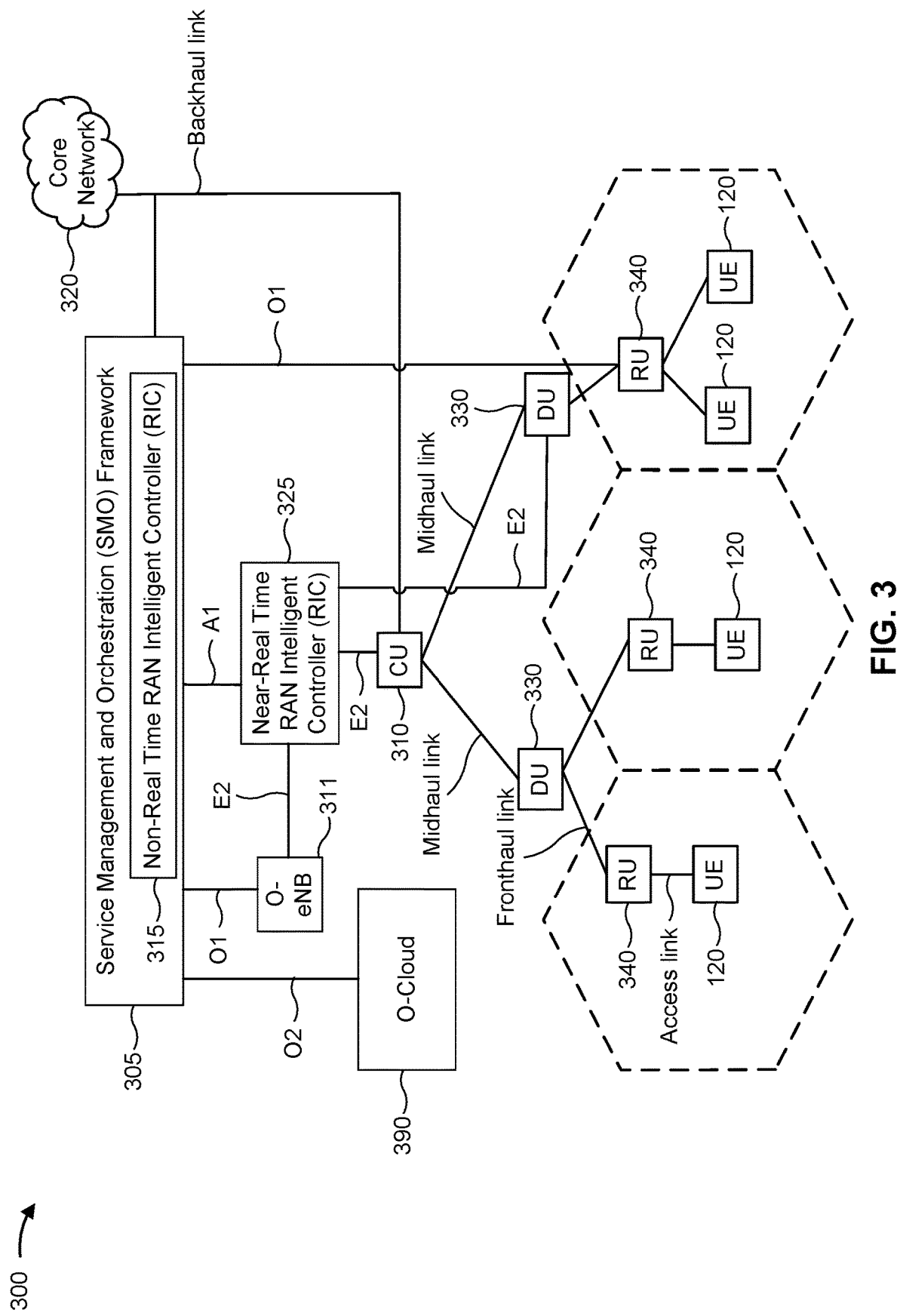
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

In some cases, network devices (e.g., network nodes and/or UEs) in a wireless communication network, such as a 5G-NR wireless communication network, may cause interference to co-existing communication services that communicate in the same or similar frequency bands. For example, 5G-NR network devices operating in the C-band (e.g., at 3.7-3.98 GHz) may cause interference to airplane radio altimeters (RAs) operating in the 4.2-4.4 GHz range, due to leakage of radiation (e.g., associated with poor quality filters) to the frequency range used by the RAs. This may lead to airplane safety issues and poor performance of the RAs.

In some cases, 5G-NR network devices that communicate using millimeter wave carrier frequencies and beyond (e.g., in FR2 and beyond) may use large antenna arrays (e.g., with greater than 64 antenna elements at network nodes and/or customer premises equipment (CPE), among other examples). As carrier frequencies increase (e.g., in FR4 and/or FR5), increasingly large antenna arrays may be used at both network nodes and UEs. Furthermore, infra nodes (e.g., repeaters, relays, intelligent reflective surface (IRS) nodes, and/or IAB nodes) may be increasingly prevalent in wireless communication networks, resulting in such wireless communication networks becoming increasingly dense. In some examples, devices that communicate using millimeter wave carriers may be equipped with receivers that operate using a superheterodyne architecture, in which demodulating a high frequency signal involves a two-stage process in which the high frequency signal is down-converted to an intermediate frequency (IF) signal, and from the IF to the baseband for digital processing. However, for many such devices, the IF is in FR3 (7.125-24.25 GHz), which is used for communication by many satellite services as well as could be licensed for other communications as 5G systems evolve into 6G services. Accordingly, network devices operating in FR2 and beyond (e.g., FR4 and/or FR5) may cause interference to co-existing communication services, such as satellite services and/or other communication services, including, but not limited to, unmanned aerial vehicles (UAVs), drones, elevated base-stations, users in high-rise buildings/skyscrapers, etc.

Some techniques and apparatuses described herein enable generation of EIRP masks for interference management. In some aspects, a network node (or a UE) may determine an EIRP limit for a communication to be transmitted, based at least in part on an EIRP mask and a spatial angle (or a set of spatial angles) associated with the communication (e.g., a set of one or more spatial angles associated with a main lobe of a beam used in beamformed communication), and the network node (or the UE) may transmit the communication in accordance with the EIRP limit. In this way, a network device (e.g., a network node or a UE) may limit the EIRP of communications at certain spatial angles (and/or in certain frequencies) that may cause interference to one or more victim nodes associated with co-existing communication services, without adversely affecting transmit power for communications at spatial angles (and/or in frequencies) that do not cause interference.

Figure 4:
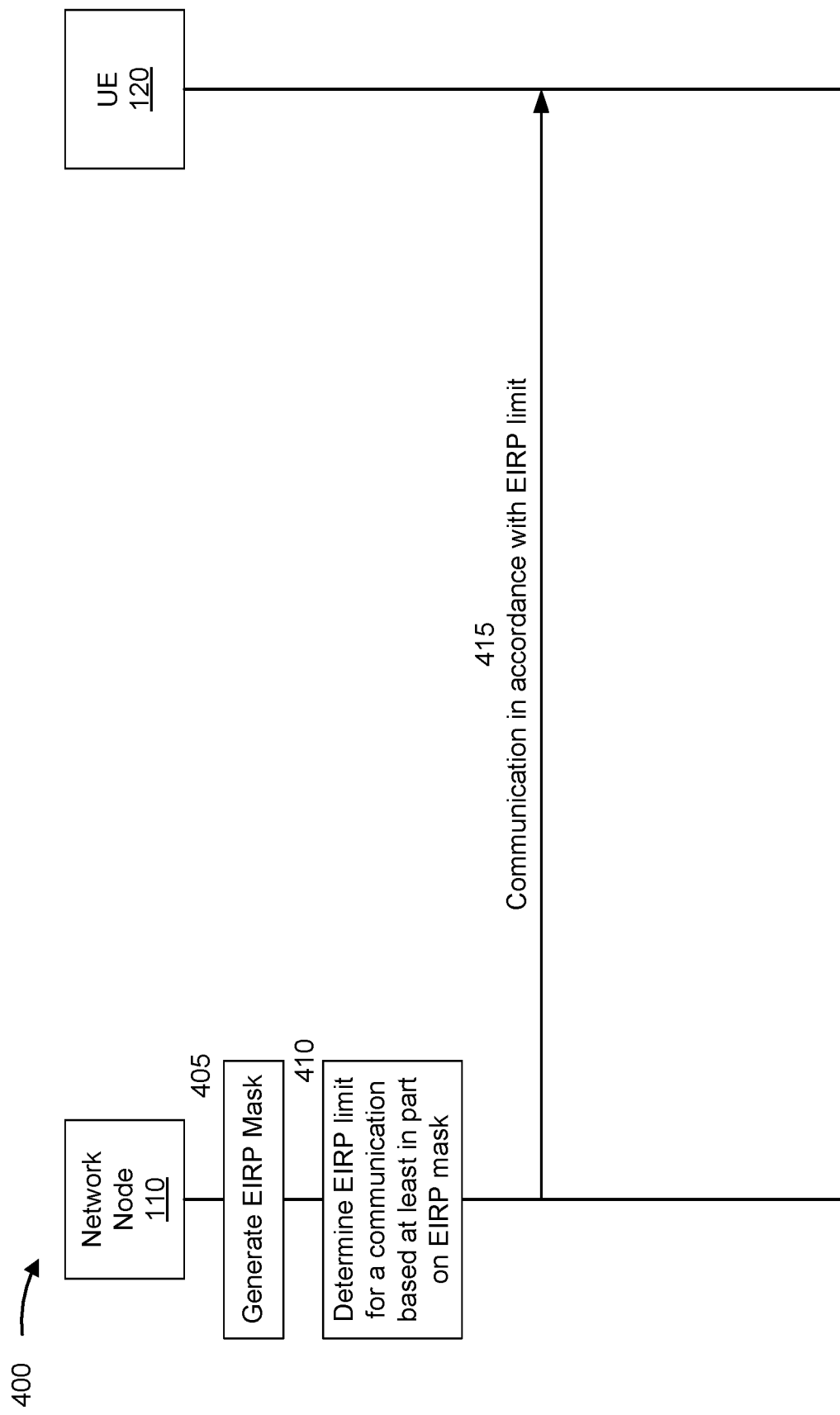
FIGS. 4-6 are diagrams illustrating examples associated with generating effective isotropic radiated power (EIRP) masks for interference management, in accordance with the present disclosure.

FIG. 4 is a diagram illustrating an example 400 associated with generating EIRP masks for interference management, in accordance with the present disclosure. As shown in FIG. 4, example 400 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 4, and by reference number 405, in some aspects, the network node 110 may generate an EIRP mask. The EIRP mask may include spatial angle dependent EIRP limits for communications transmitted by the network node 110. For example, the EIRP limits of the EIRP mask may correspond to maximum allowed EIRP values, for communications transmitted by the network node 110, as a function of the spatial angle at which the communications are transmitted, with respect to the network node 110 so that substantial interference does not occur.

In some aspects, the EIRP mask may include respective EIRP limits (e.g., spatial angle dependent EIRP limits) for a plurality of spatial angles, with respect to the network node 110. In some aspects, the EIRP mask may include spatial angle dependent EIRP limits over a range of azimuth angles and zenith or elevation angles in a local coordinate system with respect to the network node 110. Alternately, these angles can also be specified in a global coordinate system. For example, each spatial angle, of the plurality of spatial angles for which respective EIRP limits are included in the EIRP mask, may correspond to an azimuth angle and a zenith or elevation angle in the local coordinate system with respect to the network node 110. In some aspects, the plurality of spatial angles, for which respective EIRP limits are included in the EIRP mask, may include spatial angles distributed over a sphere surrounding the network node 110 with respect to which the local coordinate system is derived.

In some aspects, the plurality of spatial angles, with respect to the network node 110, may be quantized into sets of spatial angles, and the EIRP mask may include EIRP limits specified over the quantized sets of spatial angles. In some aspects, the EIRP mask may include a respective EIRP limit for each of multiple sets of spatial angles. For example, the EIRP mask may include at least a first EIRP limit associated with a first set of spatial angles and a second EIRP limit associated with a second set of spatial angles. In some aspects, plurality of spatial angles (e.g., the plurality of angles over the sphere surrounding the network node 110) may be quantized into uniform sets of spatial angles or non-uniform sets of spatial angles.

In some aspects, the EIRP mask (e.g., the EIRP limits included in the EIRP mask) may be dependent on the frequency band used by the network node 110. In some aspects, the EIRP mask may include a set of frequency band dependent EIRP masks including a respective frequency band dependent EIRP mask for each frequency band of a plurality of frequency bands associated with the network node 110. For example, the network node 110 may generate a respective frequency band dependent EIRP mask for each frequency band of the plurality of frequency bands associated with the network node 110. In some aspects, the plurality of frequency bands associated with the network node 110 may include all frequency bands in which the network node 110 is capable of communicating. In this case, the network node 110 may generate a respective frequency band dependent EIRP mask for each frequency band in which the network node 110 is capable of communicating. In some aspects, the plurality of frequency bands associated with the network node 110 may include a subset of frequency bands in which the network node 110 is capable of communicating.

In some aspects, EIRP mask may include respective EIRP masks (e.g., with different EIRP limits) associated with a number of sample frequencies. For example, the network node 110 may generate respective EIRP masks, associated with one or more different sample frequencies of interest, per frequency band.

In some aspects, the network node 110 may generate the EIRP mask at a given time based at least in part on expected positions associated with one or more victim nodes at that time. For example, the one or more victim nodes may include devices or nodes associated with a satellite service (e.g., a geosynchronous equatorial orbit (GEO) satellite service and/or a low earth orbit (LEO) satellite service, among other examples), one or more victim nodes (e.g., one or more UAVs or drones) associated with a UAV service, and/or one or more victim nodes associated with other communication services or systems. In some aspects, the network node 110 may retrieve (e.g., from a global satellite database or a local/regional compliance database) location information associated with one or more co-existing communication services (e.g., satellite, UAV, and/or other communication services), and the network node 110 may generate the EIRP mask by calculating the spatial angle dependent EIRP limits based at least in part on the location information. For example, the location information for a satellite service may include a relative location of the satellite (e.g., GEO satellite or LEO satellite) with respect to the network node 110 at the given time. In this case, the network node 110 may use the location information associated with the one or more co-existing communication services to determine the expected positions of the one or more victim nodes with respect to the network node 110. For example, the network node 110 may determine, based at least in part on the location information associated with the one or more co-existing communication services, spatial angles at which communications in a certain frequency band may result in interference with victim nodes associated with the one or more co-existing communication services. In some aspects, the network node 110 may determine different spatial angle dependent EIRP limits for different frequency bands based at least in part on the frequency band used by different types of communication services. For example, in a frequency band used by satellite services (e.g., GEO and/or LEO satellite services), the EIRP mask may limit energy (e.g., EIRP) transmitted in spatial directions over the horizon. In a frequency band used by UAVs, the EIRP mask may include different EIRP limits on different zenith or elevation angles.

In some aspects, the network node 110 may generate the EIRP mask based at least in part on the expected locations of the one or more victim nodes at a current time at which the network node 110 retrieves the location information (e.g., from a database). In some aspects, the network node 110 may generate an EIRP mask based at least in part on a time at which a communication is to be transmitted. For example, the network node 110 may generate the EIRP mask based at least in part on the expected positions associated with one or more victim nodes at the time at which the communication is to be transmitted. In some aspects, the network node 110 may apply the EIRP mask to communications transmitted by the network node 110, until the network node 110 re-generates the EIRP mask. In some aspects, the network node 110 may periodically re-generate the EIRP mask (e.g., re-calculate the spatial angle dependent EIRP limits at a new time).

In some aspects, the generation of the EIRP mask, by the network node 110, may be based at least in part on EIRP limits specified in a wireless communications standard (e.g., a 3GPP standard, an ITU standard, or a regional standard, such as a standard imposed by an organization such as the Conference of European Postal and Telecommunications Administration (CEPT) or the Federal Communications Commission (FCC), among other examples). In some aspects, the generation of the EIRP mask, by the network node 110, may be based at least in part EIRP limits that are specific to a vendor or operator of the network node 110 (e.g., where the vendor or operator may be a public organization or a private enterprise or a governmental body or correspond to a private network). In some aspects, the network node 110 may generate the EIRP mask by detecting the spatial angle dependent EIRP limits (e.g., based at least in part on the time of day, location information, and/or frequency band).

In some aspects, as shown in FIG. 4, the network node 110 may generate the EIRP mask. In some aspects, such as in cases in which the expected positions of victim nodes remain constant with respect to the network node 110, the network node 110 may store an EIRP mask and apply the stored EIRP mask to communications transmitted by the network node 110.

As further shown in FIG. 4, and by reference number 410, the network node 110 may determine an EIRP limit for a communication to be transmitted by the network node 110, based at least in part on the EIRP mask. In some aspects, the network node 110 may determine the EIRP limit for the communication based at least in part on the EIRP mask and a spatial angle (or a set of spatial angles) associated with the communication. In some aspects, the network node 110 may determine the EIRP limit for the communication based at least in part on the spatial angle dependent EIRP limit (or limits) associated with the spatial angle (or set of spatial angles) at which the communication is to be transmitted relative to the network node 110. For example, the set spatial angles associated with the communication (e.g., the set of spatial angles at which the communication is transmitted) may include a set of one or more spatial angles associated with the main lobe of the beam used in beamformed communication. In some aspects, the network node 110 may determine the EIRP limit for the communication based at least in part on the spatial angle (or set of spatial angles) associated with the communication with respect to the network node 110 and based at least in part on the frequency band in which the communication is to be transmitted. For example, the network node 110 may determine the EIRP limit for the communication based at least in part on the spatial angle dependent EIRP limit (or limits) associated with the set of spatial angles associated with the communication in a respective frequency band dependent EIRP mask for the frequency band in which communication is to be transmitted.

As further shown in FIG. 4, and by reference number 415, the network node 110 may transmit one or more communications in accordance with the EIRP limit determined for the communications. In some aspects, as shown in FIG. 4, the network node 110 may transmit the communications to the UE 120. Alternatively, the network node 110 may transmit the communications to another network device.

In some aspects, the network node 110 may transmit communication with an EIRP that satisfies (e.g., is less than or equal to) the EIRP limit determined for the communication. For example, the network node 110 may transmit the communication, at a spatial angle (or a set of spatial angles) with respect to the network node 110, with an EIRP that satisfies the EIRP limit associated with that spatial angle (or set of spatial angles) for the frequency band in which the communication is transmitted. In some aspects, the network node 110 may transmit the communication using a transmit power that results in the EIRP for the communication satisfying the EIRP limit determined for the communication.

In some aspects, the EIRP for the communication may be determined based at least in part on a hybrid (or analog or digital) beamforming codebook of beams used to transmit the communication. In this case, the network node 110 may use hybrid (or analog or digital) beamforming to generate a beam on which the communication is transmitted with an EIRP that satisfies the EIRP limit. For example, the hybrid (or analog or digital) beamforming codebook of beams may include a codebook of steered beams, which may be pre-configured in terms of codebook size and/or steering angles relative to boresight direction.

In some aspects, the EIRP for the communication may be determined based at least in part on electric and magnetic field properties of an antenna array used to transmit the communication. For example, the EIRP may be determined for a communication based at least in part on a beam weight (w), a co-polarization electric field ($E_\Theta$) of the antenna array, and a cross-polarization electric field ($E_\Phi$) of the antenna array based at least in part on:

$$SNR_{opt} = \max_w |E_\Theta^H w|^2 + |E_\Phi^H w|^2 = \max_w w^H \cdot (E_\Theta E_\Theta^H + E_\Phi E_\Phi^H) \cdot w =$$

$$\frac{E_\Theta^H E_\Theta + E_\Phi^H E_\Phi + \sqrt{(E_\Theta^H E_\Theta - E_\Phi^H E_\Phi)^2 + 4|E_\Theta^H E_\Phi|^2}}{2}$$

where $SNR_{opt}$ is an optimum signal-to-noise ratio (SNR) at a spatial angle ($\theta$, $\varphi$).

In some aspects, the network node 110 may transmit one or more communications in accordance with respective EIRP limits determined for the communications based at least in part on the EIRP mask. In some examples, the EIRP mask may specify EIRP limits for only a subset of the possible spatial angles and frequencies at which communications may be transmitted by the network node 110, and due to interpolation errors, calibration inaccuracies and hardware imperfections (e.g., that may result in beam steering errors), the network node 110 may not be able to guarantee that all of the communications transmitted by the network node 110 meet EIRP regulations (e.g., standard based EIRP regulations, vendor/operator based EIRP regulations, and/or other EIRP regulations) at all angles and all frequencies by satisfying the EIRP mask. In some aspects, by satisfying the EIRP mask, the network node 110 may meet a threshold probability for satisfying the EIRP regulations over all angles and all frequencies. For example, the threshold probability may be network configured. In some aspects, satisfying the EIRP mask for all communications by the network node 110 may assure a probabilistic guarantee to meet the threshold probability for satisfying the EIRP regulations over all angles and all frequencies.

In some aspects, in a case in which the network node 110 decreases the transmit power for a downlink communication to the UE 120 to satisfy the EIRP limit determined for the downlink communication based at least in part on the EIRP mask, a compensation may be applied to open loop power control of the UE 120 to compensate for the reduced transmission power of the downlink communication. In some aspects, the network node 110 may apply the compensation factor to one or more parameters in the power control commands transmitted to the UE 120 for the open loop power control of the UE 120. In some aspects, the compensation factor may be explicitly signaled to the UE 120. For example, the network node 110 may transmit, to the UE 120, an indication of the compensation factor associated with a downlink communication to the UE 120. The UE 120 may receive the indication of the compensation factor, and the UE 120 may apply the compensation factor when receiving the downlink communication from the network node 110.

As indicated above, FIG. 4 is provided as an example. Other examples may differ from what is described with respect to FIG. 4.

Figure 5:
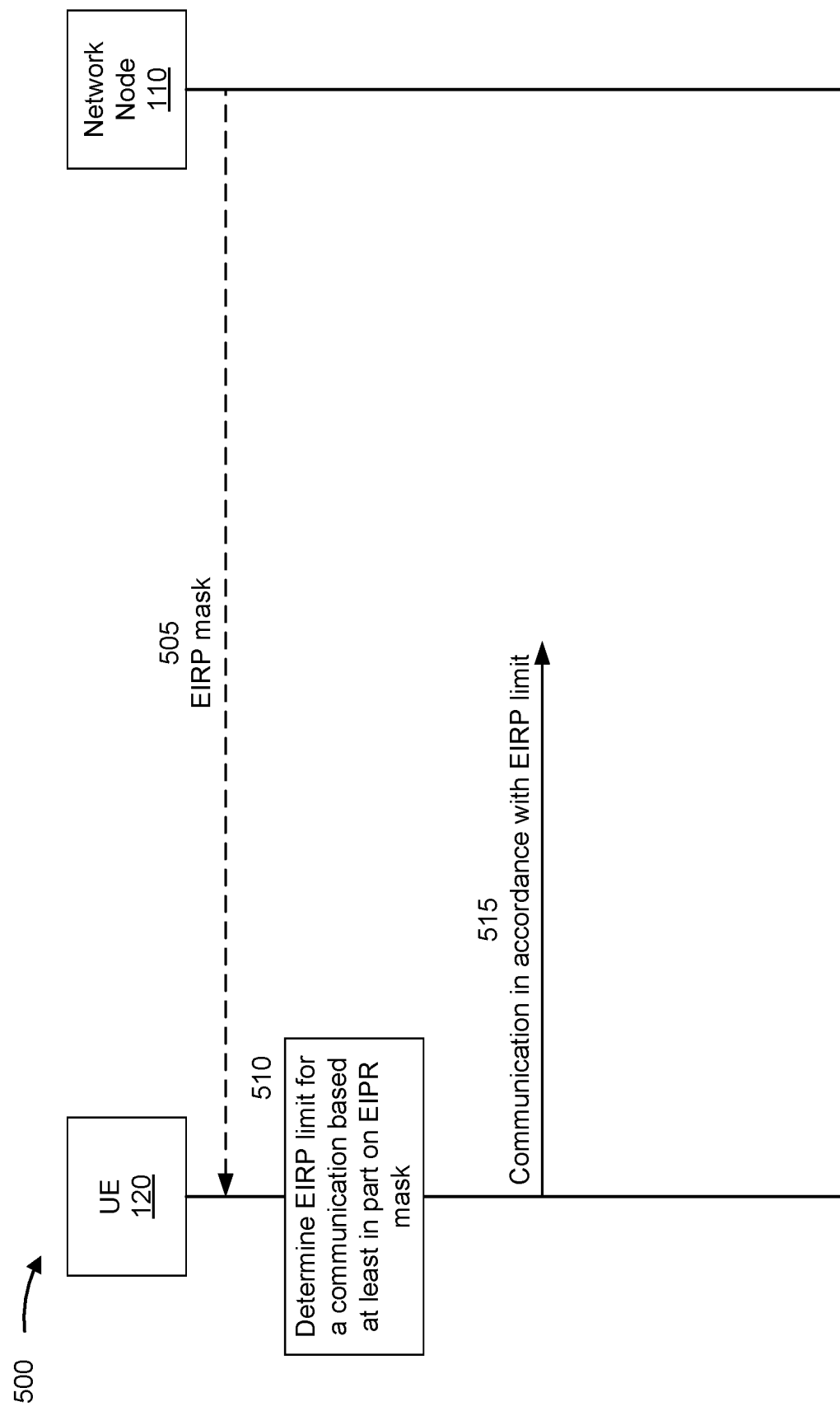

FIG. 5 is a diagram illustrating an example 500 associated with generating EIRP masks for interference management, in accordance with the present disclosure. As shown in FIG. 5, example 500 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 5, and by reference number 505, in some aspects, the network node 110 may transit, to the UE 120 an indication of an EIRP mask for the UE 120. The UE 120 may receive, from the network node 110, the indication of the EIRP mask for the UE 120. In some aspects, the network node 110 may transmit the indication of the EIRP mask to the UE 120 in an RRC message. In some aspects, the network node 110 may transmit the indication of the EIRP mask to the UE 120 in a MAC control element (MAC-CE). In some aspects, the network node 110 may transmit the indication of the EIRP mask to the UE 120 in downlink control information (DCI). The EIRP mask may include spatial angle dependent EIRP limits for communications transmitted by the UE 120. For example, the EIRP limits of the EIRP mask may correspond to maximum allowed EIRP values, for communications transmitted by the UE 120, as a function of the spatial angle at which the communications are transmitted, with respect to the UE 120.

In some aspects, the EIRP mask may include respective EIRP limits (e.g., spatial angle dependent EIRP limits) for a plurality of spatial angles, with respect to the UE 120. In some aspects, the EIRP mask may include spatial angle dependent EIRP limits over a range of azimuth angles and zenith or elevation angles in a local coordinate system with respect to the UE 120. For example, each spatial angle, of the plurality of spatial angles for which respective EIRP limits are included in the EIRP mask, may corresponds to an azimuth angle and a zenith or elevation angle in the local coordinate system with respect to the UE 120. In some aspects, the plurality of spatial angles, for which respective EIRP limits are included in the EIRP mask, may include spatial angles distributed over a sphere surrounding the UE 120.

In some aspects, the plurality of spatial angles, with respect to the UE 120, may be quantized into sets of spatial angles, and the EIRP mask may include EIRP limits specified over the quantized sets of spatial angles. In some aspects, the EIRP mask may include a respective EIRP limit for each of multiple sets of spatial angles. For example, the EIRP mask may include at least a first EIRP limit associated with a first set of spatial angles and a second EIRP limit associated with a second set of spatial angles. In some aspects, plurality of spatial angles (e.g., the plurality angles over the sphere surrounding the UE 120) may be quantized into uniform sets of spatial angles or non-uniform sets of spatial angles.

In some aspects, the EIRP mask (e.g., the EIRP limits included in the EIRP mask) may be dependent on the frequency band used by the UE 120. In some aspects, the EIRP mask may include a set of frequency band dependent EIRP masks including a respective frequency band dependent EIRP mask for each frequency band of a plurality of frequency bands associated with the UE 120. For example, the network node 110 may generate a respective frequency band dependent EIRP mask for each frequency band of the plurality of frequency bands associated with the UE 120. In some aspects, the plurality of frequency bands associated with the UE 120 may include all frequency bands in which the UE 120 is capable communicating. In some aspects, the plurality of frequency bands associated with the UE 120 may include a subset of frequency bands in which UE 120 is capable of communicating.

In some aspects, the EIRP mask may include respective EIRP masks (e.g., with different EIRP limits) associated with a number of sample frequencies. For example, the EIRP mask for the UE 120 may include respective EIRP masks, associated with one or more different sample frequencies of interest, per frequency band.

In some aspects, the EIRP mask for the UE 120 may be based at least in part on a location and/or an orientation of the UE 120. In some aspects, the network node 110 may generate the EIRP for the UE 120. For example, the network node 110 may generate the EIRP mask for the UE 120 based at least in part at a location and/or an orientation of the UE 120 at a given time and based at least in part on expected positions associated with one or more victim nodes at that time. For example, the one or more victim nodes may include one or more victim nodes associated with a satellite service (e.g., a GEO satellite service and/or a LEO satellite service, among other examples), one or more victim nodes associated with a UAV service, and/or one or more victim nodes associated with other communication services or systems. In some aspects, the network node 110 may retrieve (e.g., from a database) location information associated with one or more co-existing communication services (e.g., satellite, UAV, and/or other communication services), and the network node 110 may generate the EIRP mask for the UE 120 by calculating the spatial angle dependent EIRP limits for the UE 120 based at least in part on the location information and based at least in part on the location and/or orientation of the UE 120. In some aspects, the network node 110 may determine different spatial angle dependent EIRP limits for different frequency bands based at least in part on the frequency band used by different types of communication services. For example, in a frequency band used by satellite services (e.g., GEO and/or LEO satellite services), the EIRP mask may limit energy (e.g., EIRP) transmitted by the UE 120 in spatial directions over the horizon. In a frequency band used by UAVs, the EIRP mask may include different EIRP limits on different zenith angles.

In some aspects, the generation of the EIRP mask for the UE 120 may be based at least in part on EIRP limits specified in a wireless communications standard (e.g., a 3GPP standard). In some aspects, the generation of the EIRP mask for the UE 120 may be based at least in part EIRP limits that are specific to a vendor or operator of the network node 110.

In some aspects, as shown in FIG. 5, the UE 120 may receive the indication of an EIRP mask from the network node 110. In some aspects, the UE 120 may generate the EIRP mask for the UE 120. For example, the UE 120 may generate the EIRP mask for the UE 120 based at least in part on the location and/or the orientation of the UE 120. In some aspects, the UE 120 may generate the EIRP mask based at least in part on the location and/or the orientation of the UE 120, and based at least in part on expected positions associated with one or more victim nodes (e.g., one or more victim nodes associated with a satellite service, a UAV service, or another communication service). In some aspects, the network node 110 may transmit, to the UE 120 (e.g., via an RRC message, a MAC-CE, or DCI), an indication of the expected positions associated with the one or more victim nodes. For example, the network node 110 may retrieve (e.g., from a database) location information associated with one or more co-existing communication services (e.g., satellite, UAV, and/or other communication services), and the network node 110 may transmit the location information to the UE 120. In this case, the UE 120 may generate the EIRP mask, based at least in part on the location and/or the orientation of the UE 120, using the location information received from the network node 110.

As further shown in FIG. 5, and by reference number 510, the UE 120 may determine an EIRP limit for a communication to be transmitted by the UE 120, based at least in part on the EIRP mask for the UE 120. In some aspects, the UE 120 may determine the EIRP limit for the communication based at least in part on the EIRP mask and a spatial angle (or a set of spatial angles) associated with the communication. In some aspects, the UE 120 may determine the EIRP limit for the communication based at least in part on the spatial angle dependent EIRP limit (or limits) associated with the spatial angle (or set of spatial angles) at which the communication is to be transmitted relative to the UE 120. For example, the set spatial angles associated with the communication (e.g., the set of spatial angles at which the communication is transmitted) may include a set of one or more spatial angles associated with the main lobe of the beam used in beamformed communication. In some aspects, the UE 120 may determine the EIRP limit for the communication based at least in part on the spatial angle (or set of spatial angles) associated with the communication with respect to the UE 120 and based at least in part on the frequency band in which the communication is to be transmitted. For example, the UE 120 may determine the EIRP limit for the communication based at least in part on the spatial angle dependent EIRP limit (or limits) associated with the set of spatial angles associated with the communication in a respective frequency band dependent EIRP mask for the frequency band in which communication is to be transmitted.

As further shown in FIG. 5, and by reference number 515, the UE 120 may transmit the communication in accordance with the EIRP limit determined for the communication. In some aspects, the communication may be an uplink communication, and the UE 120 may transmit the communication to the network node 110. In some aspects, the communication may be a sidelink communication, and the UE 120 may transmit the communication to another UE.

In some aspects, the UE 120 may transmit communication with an EIRP that satisfies (e.g., is less than or equal to) the EIRP limit determined for the communication. For example, the UE 120 may transmit the communication, at spatial angle (or set of spatial angles) with respect to the UE 120, with an EIRP that satisfies the EIRP limit associated with that spatial angle (or set of spatial angles) for the frequency band in which the communication is transmitted. In some aspects, the UE 120 may transmit the communication using a transmit power that results in the EIRP for the communication satisfying the EIRP limit determined for the communication.

In some aspects, the EIRP for the communication may be determined based at least in part on a hybrid beamforming codebook of beams used to transmit the communication. For example, the hybrid beamforming codebook of beams may include a codebook of steered beams, which may be pre-configured in terms of codebook size and/or steering angles relative to boresight.

In some aspects, the EIRP for the communication may be determined based at least in part on electric and magnetic field properties of an antenna array used to transmit the communication. For example, the EIRP may be determined for a communication based at least in part on a beam weight (w), a co-polarization electric field vector ($E_\Theta$) of the antenna array, and a cross-polarization electric field vector ($E_\Phi$) of the antenna array based at least in part on:

$$SNR_{opt} = \max_w |E_\Theta^H w|^2 + |E_\Phi^H w|^2 = \max_w w^H \cdot (E_\Theta E_\Theta^H + E_\Phi E_\Phi^H) \cdot w = $$

$$\frac{E_\Theta^H E_\Theta + E_\Phi^H E_\Phi + \sqrt{(E_\Theta^H E_\Theta - E_\Phi^H E_\Phi)^2 + 4|E_\Theta^H E_\Phi|^2}}{2}$$

where SNR opt is an optimum SNR at a spatial angle (θ, φ).

In some aspects, the UE 120 may transmit one or more communications (e.g., uplink communications and/or sidelink communications) in accordance with respective EIRP limits determined for the communications based at least in part on the EIRP mask. In some examples, the EIRP mask may specify EIRP limits for only a subset of the possible spatial angles and frequencies at which communications may be transmitted by the UE 120, and due to interpolation errors, calibration inaccuracies and hardware imperfections (e.g., that may result in beam steering errors), satisfying the EIRP mask may not be able to guarantee that all of the communications transmitted by UE 120 meet EIRP regulations (e.g., standard based EIRP regulations, vendor/operator based EIRP regulations, and/or other EIRP regulations) at all angles and all frequencies. In some aspects, by satisfying the EIRP mask, the UE 120 may meet a threshold probability for satisfying the EIRP regulations over all angles and all frequencies. For example, the threshold probability may be network configured for the UE 120. In this case, the network node 110 may transmit an indication of the threshold probability to the UE 120 (e.g., via an RRC message, a MAC-CE, or DCI). In some aspects, satisfying the EIRP mask for all communications by the UE 120 may assure a probabilistic guarantee to meet the threshold probability for satisfying the EIRP regulations over all angles and all frequencies.

As indicated above, FIG. 5 is provided as an example. Other examples may differ from what is described with respect to FIG. 5.

Figure 6:
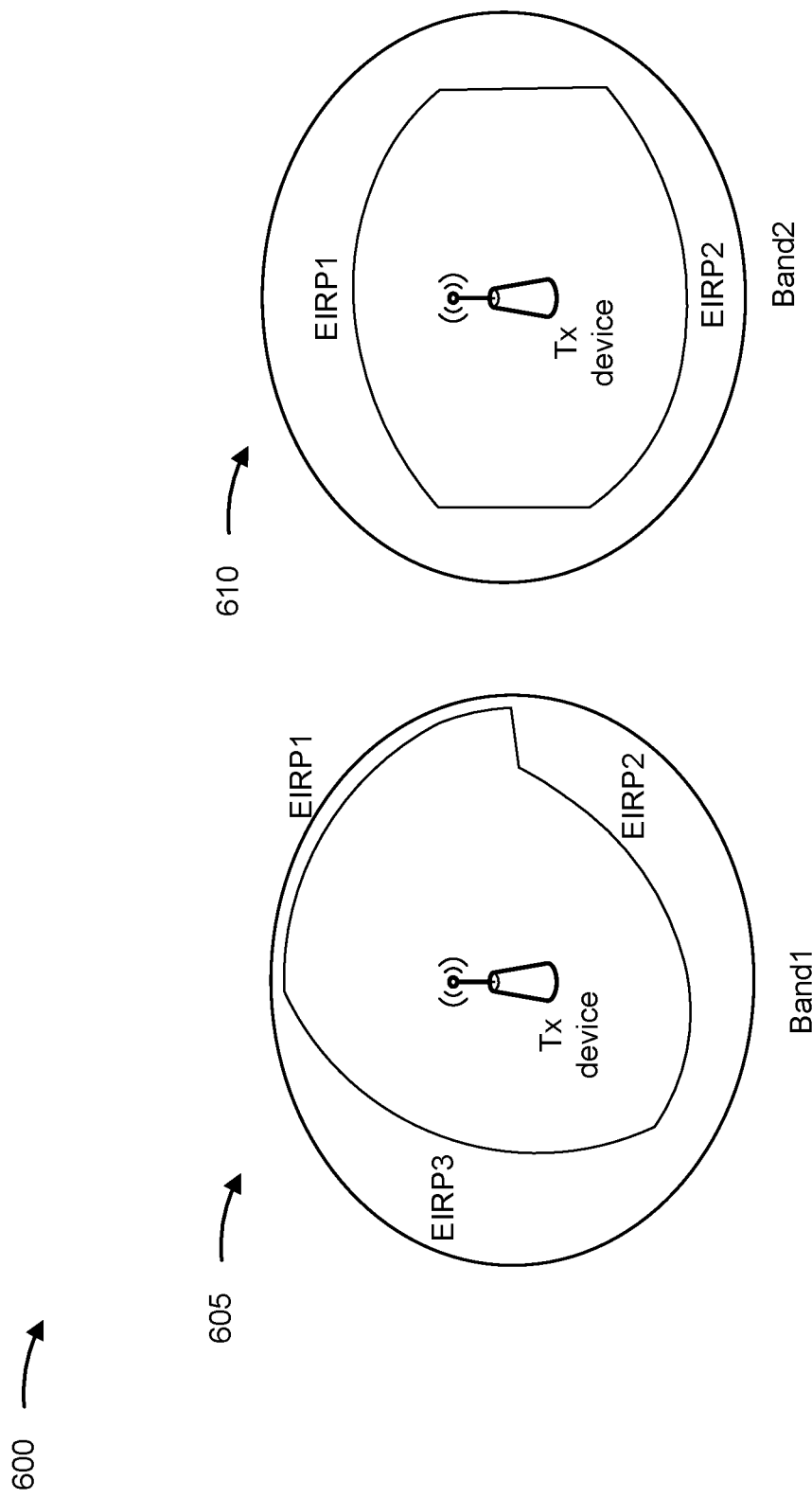

FIG. 6 is a diagram illustrating an example 600 associated with generating EIRP masks for interference management, in accordance with the present disclosure. As shown in FIG. 6, example 600 shows a first EIRP mask 605 associated with a first frequency band (Band1) and a second EIRP mask 610 associated with a second frequency band (Band2) for a transmitting device. For example, the transmitting device may be a network node 110, a UE 120, or another network device.

As shown in FIG. 6, the first EIRP mask 605, for communications in Band1, may include three piece-wise EIRP limits across different angles over a sphere surrounding the transmitting device. That is, the first EIRP mask 605, for Band1, may include first EIRP limit (EIRP1) associated with a first set of spatial angles, a second EIRP limit (EIRP2) associated with a second set of spatial angles, and a third EIRP limit (EIRP3) associated with a third set of spatial angles.

As further shown in FIG. 6, the second EIRP mask 610, for communications in Band2, may include two piece-wise EIRP limits across different angles over a sphere surrounding the transmitting device. That is, the second EIRP mask 610, for Band2, may include first EIRP limit (EIRP1) associated with a first set of spatial angles and a second EIRP limit (EIRP2) associated with a second set of spatial angles.

As indicated above, FIG. 6 is provided as an example. Other examples may differ from what is described with respect to FIG. 6.

Figure 7:
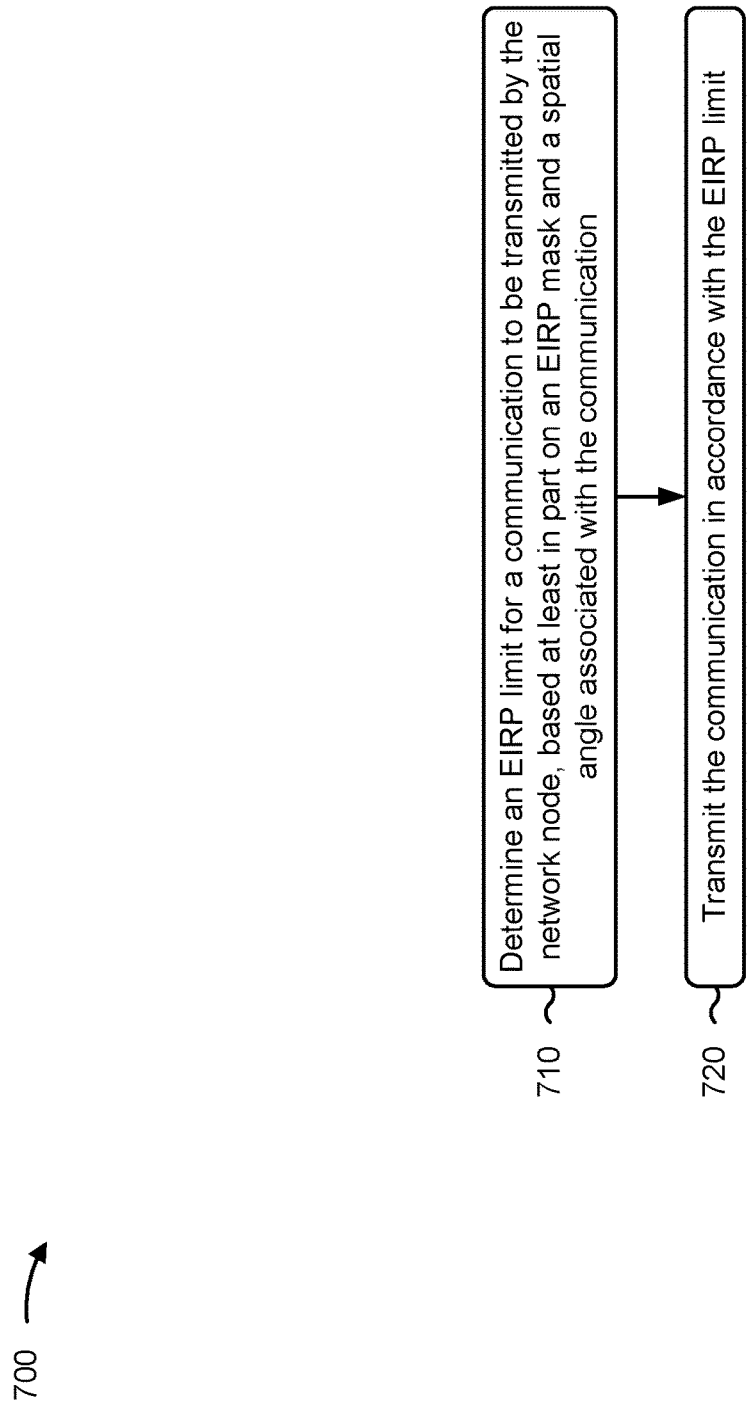
FIGS. 7-8 are diagrams illustrating example processes associated with generating EIRP masks for interference management, in accordance with the present disclosure.

FIG. 7 is a diagram illustrating an example process 700 performed, for example, by a network node, in accordance with the present disclosure. Example process 700 is an example where the network node (e.g., network node 110) performs operations associated with generating EIRP masks for interference management.

As shown in FIG. 7, in some aspects, process 700 may include determining an EIRP limit for a communication to be transmitted by the network node, based at least in part on an EIRP mask and a spatial angle associated with the communication (block 710). For example, the network node (e.g., using communication manager 150 and/or determination component 908, depicted in FIG. 9) may determine an EIRP limit for a communication to be transmitted by the network node, based at least in part on an EIRP mask and a spatial angle associated with the communication, as described above.

As further shown in FIG. 7, in some aspects, process 700 may include transmitting the communication in accordance with the EIRP limit (block 720). For example, the network node (e.g., using communication manager 150 and/or transmission component 904, depicted in FIG. 9) may transmit the communication in accordance with the EIRP limit, as described above.

Process 700 may include additional aspects, such as any single aspect or any combination of aspects described below and/or in connection with one or more other processes described elsewhere herein.

In a first aspect, the EIRP mask includes spatial angle dependent EIRP limits for the network node.

In a second aspect, the spatial angle dependent EIRP limits, included in the EIRP mask, include respective EIRP limits for a plurality of spatial angles, and each spatial angle, of the plurality of spatial angles, corresponds to an azimuth angle and a zenith or elevation angle in a local coordinate system with respect to the network node.

In a third aspect, the spatial angle dependent EIRP limits, included in the EIRP mask, include at least a first EIRP limit associated with a first set of spatial angles and a second EIRP limit associated with a second set of spatial angles.

In a fourth aspect, the EIRP mask includes a respective frequency band dependent EIRP mask for each frequency band of a plurality of frequency bands associated with the network node.

In a fifth aspect, determining the EIRP limit for the communication includes determining the EIRP limit for the communication based at least in part on the respective frequency band dependent EIRP mask for a frequency band, of the plurality of frequency bands associated with the network node, in which the communication is transmitted by the network node.

In a sixth aspect, process 700 includes generating the EIRP mask.

In a seventh aspect, generating the EIRP mask includes generating the EIRP mask based at least in part on a time at which the communication is to be transmitted.

In an eighth aspect, generating the EIRP mask based at least in part on a time at which the communication is to be transmitted includes generating the EIRP mask based at least in part on expected positions associated with one or more victim nodes at the time at which the communication is to be transmitted.

In a ninth aspect, the one or more victim nodes include one or more victim nodes associated with a satellite service or a UAV service.

In a tenth aspect, transmitting the communication in accordance with the EIRP limit includes transmitting the communication with an EIRP that satisfies the EIRP limit, wherein the EIRP for the communication is determined based at least in part on a hybrid beamforming codebook of beams used to transmit the communication.

In an eleventh aspect, transmitting the communication in accordance with the EIRP limit includes transmitting the communication with an EIRP that satisfies the EIRP limit, wherein the EIRP for the communication is determined based at least in part on electric and magnetic field properties of an antenna array used to transmit the communication.

In a twelfth aspect, the communication is a downlink communication transmitted to a UE in accordance with the EIRP limit.

In a thirteenth aspect, determining the EIRP limit for the communication to be transmitted by the network node, based at least in part on the EIRP mask and the spatial angle associated with the communication, includes determining the EIRP limit for the communication based at least in part on the EIRP mask and a set of spatial angles associated with a main lobe of a beam to be used to transmit the communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
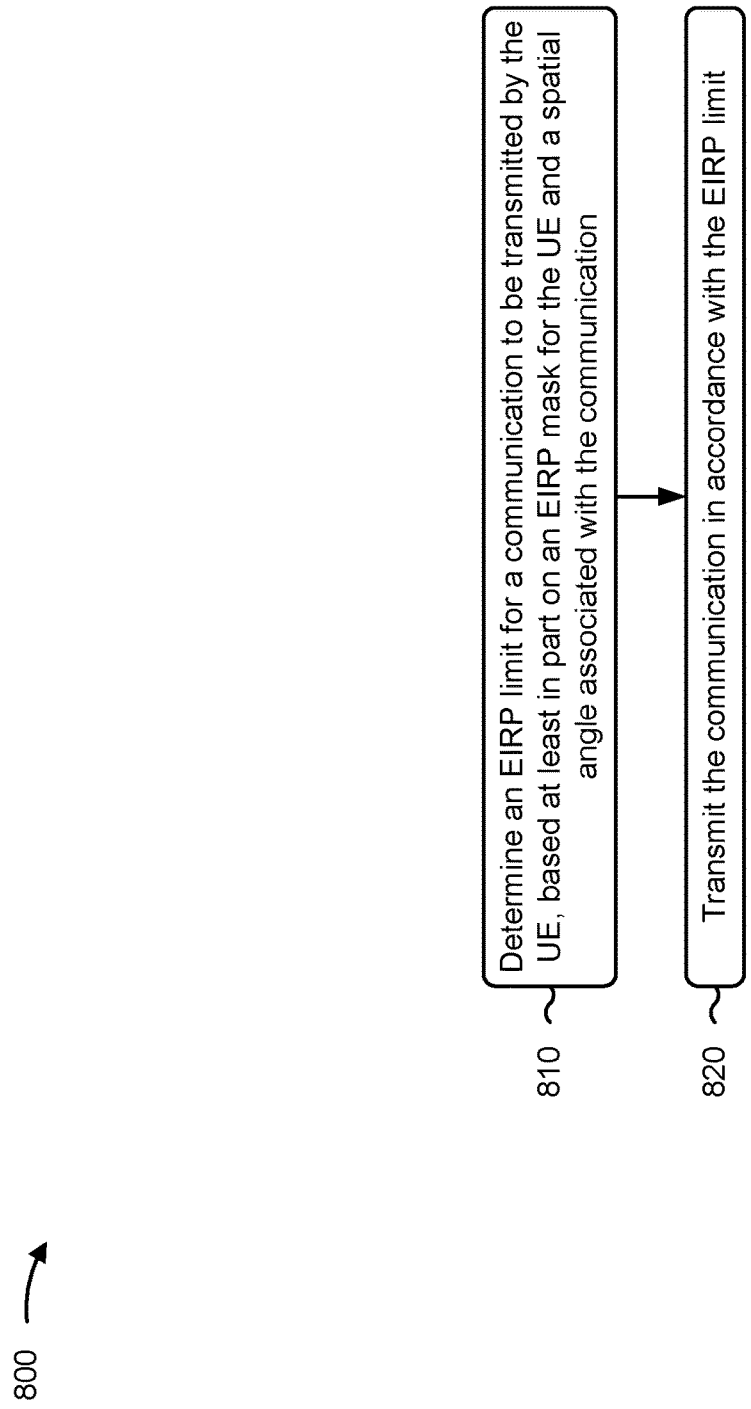

FIG. 8 is a diagram illustrating an example process 800 performed, for example, by a UE, in accordance with the present disclosure. Example process 800 is an example where the UE (e.g., UE 120) performs operations associated with generating EIRP masks for interference management.

As shown in FIG. 8, in some aspects, process 800 may include determining an EIRP limit for a communication to be transmitted by the UE, based at least in part on an EIRP mask for the UE and a spatial angle associated with the communication (block 810). For example, the UE (e.g., using communication manager 140 and/or determination component 1008, depicted in FIG. 10) may determine an EIRP limit for a communication to be transmitted by the UE, based at least in part on an EIRP mask for the UE and a spatial angle associated with the communication, as described above.

As further shown in FIG. 8, in some aspects, process 800 may include transmitting the communication in accordance with the EIRP limit (block 820). For example, the UE (e.g., using communication manager 140 and/or transmission component 1004, depicted in FIG. 10) may transmit the communication in accordance with the EIRP limit, as described above.

Process 800 may include additional aspects, such as any single aspect or any combination of aspects described below and/or in connection with one or more other processes described elsewhere herein.

In a first aspect, process 800 includes receiving, from a network node, an indication of the EIRP mask for the UE.

In a second aspect, the EIRP mask for the UE is based at least in part on at least one of a location or an orientation of the UE.

In a third aspect, the indication of the EIRP mask for the UE is included in an RRC message, a MAC-CE, or DCI.

In a fourth aspect, the EIRP mask includes spatial angle dependent EIRP limits for the UE.

In a fifth aspect, the spatial angle dependent EIRP limits, included in the EIRP mask, include respective EIRP limits for a plurality of spatial angles, and each spatial angle, of the plurality of spatial angles, corresponds to an azimuth angle and a zenith or an elevation angle in a local coordinate system with respect to the UE.

In a sixth aspect, the spatial angle dependent EIRP limits, included in the EIRP mask, include at least a first EIRP limit associated with a first set of spatial angles and a second EIRP limit associated with a second set of spatial angles.

In a seventh aspect, the EIRP mask includes a respective frequency band dependent EIRP mask for each frequency band of a plurality of frequency bands associated with the UE.

In an eighth aspect, determining the EIRP limit for the communication includes determining the EIRP limit for the communication based at least in part on the respective frequency band dependent EIRP mask for a frequency band, of the plurality of frequency bands associated with the UE, in which the communication is transmitted by the UE.

In a ninth aspect, process 800 includes generating the EIRP mask based at least in part on at least one of a location or an orientation of the UE.

In a tenth aspect, process 800 includes receiving, from a network node, an indication of expected positions associated with one or more victim nodes, and generating the EIRP mask based at least in part on at least one of the location or the orientation of the UE includes generating the EIRP mask based at least in part on at least one of the location or the orientation of the UE and based at least in part on the expected positions associated with the one or more victim nodes.

In an eleventh aspect, the one or more victim nodes include one or more victim nodes associated with a satellite service or a UAV service.

In a twelfth aspect, transmitting the communication in accordance with the EIRP limit includes transmitting the communication with an EIRP that satisfies the EIRP limit, wherein the EIRP for the communication is determined based at least in part on a hybrid beamforming codebook of beams used to transmit the communication.

In a thirteenth aspect, transmitting the communication in accordance with the EIRP limit includes transmitting the communication with an EIRP that satisfies the EIRP limit, wherein the EIRP for the communication is determined based at least in part on electric and magnetic field properties of an antenna array used to transmit the communication.

In a fourteenth aspect, the communication is an uplink communication transmitted to a network node in accordance with the EIRP limit or a sidelink communication transmitted to another UE in accordance with the EIRP limit.

In a fifteenth aspects, determining the EIRP limit for the communication to be transmitted by the UE, based at least in part on the EIRP mask for the UE and the spatial angle associated with the communication, includes determining the EIRP limit for the communication based at least in part on the EIRP mask for the UE and a set of spatial angles associated with a main lobe of a beam to be used to transmit the communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
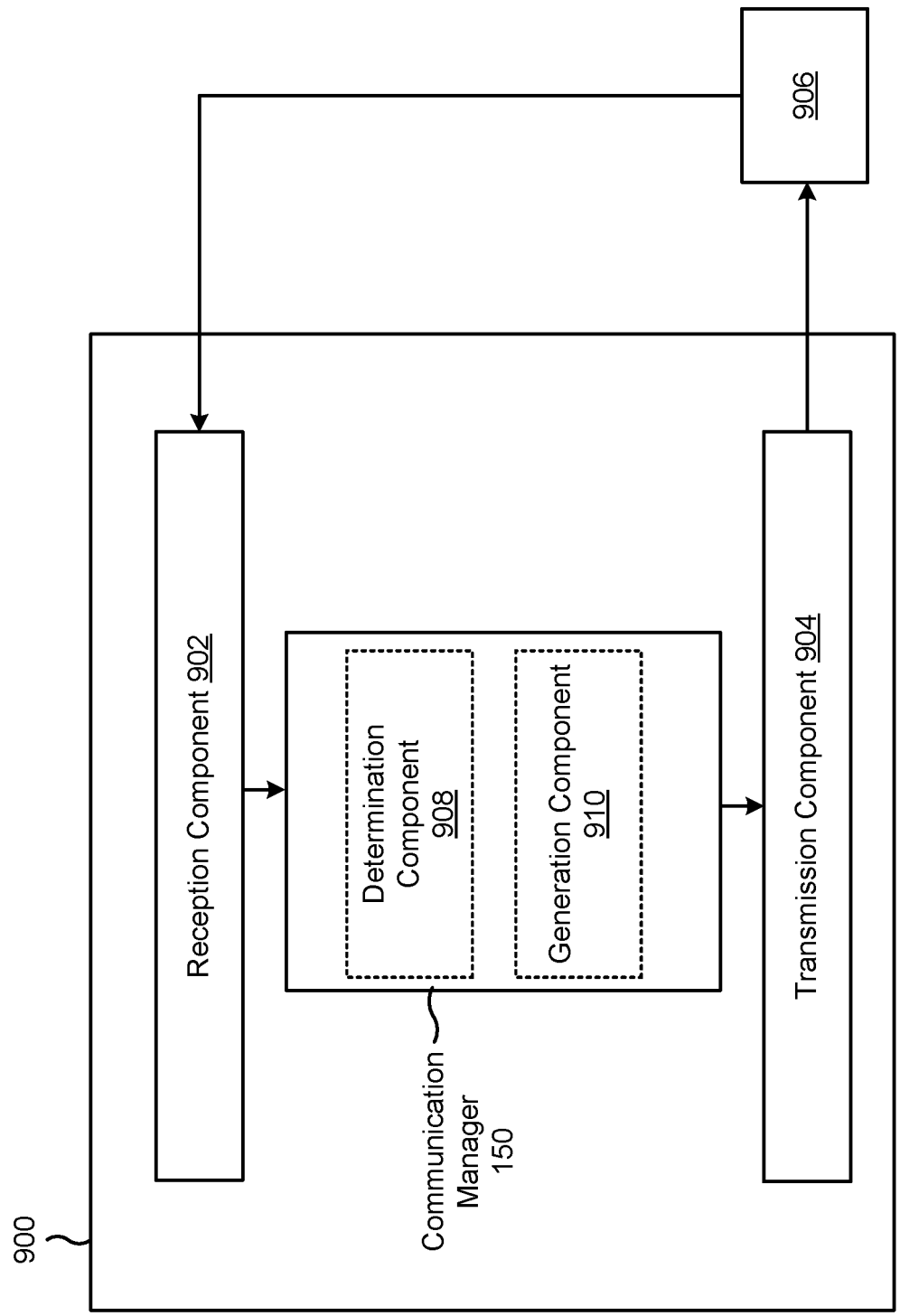
FIGS. 9-10 are diagrams of example apparatuses for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of a determination component 908 and/or a generation component 910, among other examples.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The determination component 908 may determine an EIRP limit for a communication to be transmitted by the network node, based at least in part on an EIRP mask and a spatial angle associated with the communication. The transmission component 904 may transmit the communication in accordance with the EIRP limit.

The generation component 910 may generate the EIRP mask.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
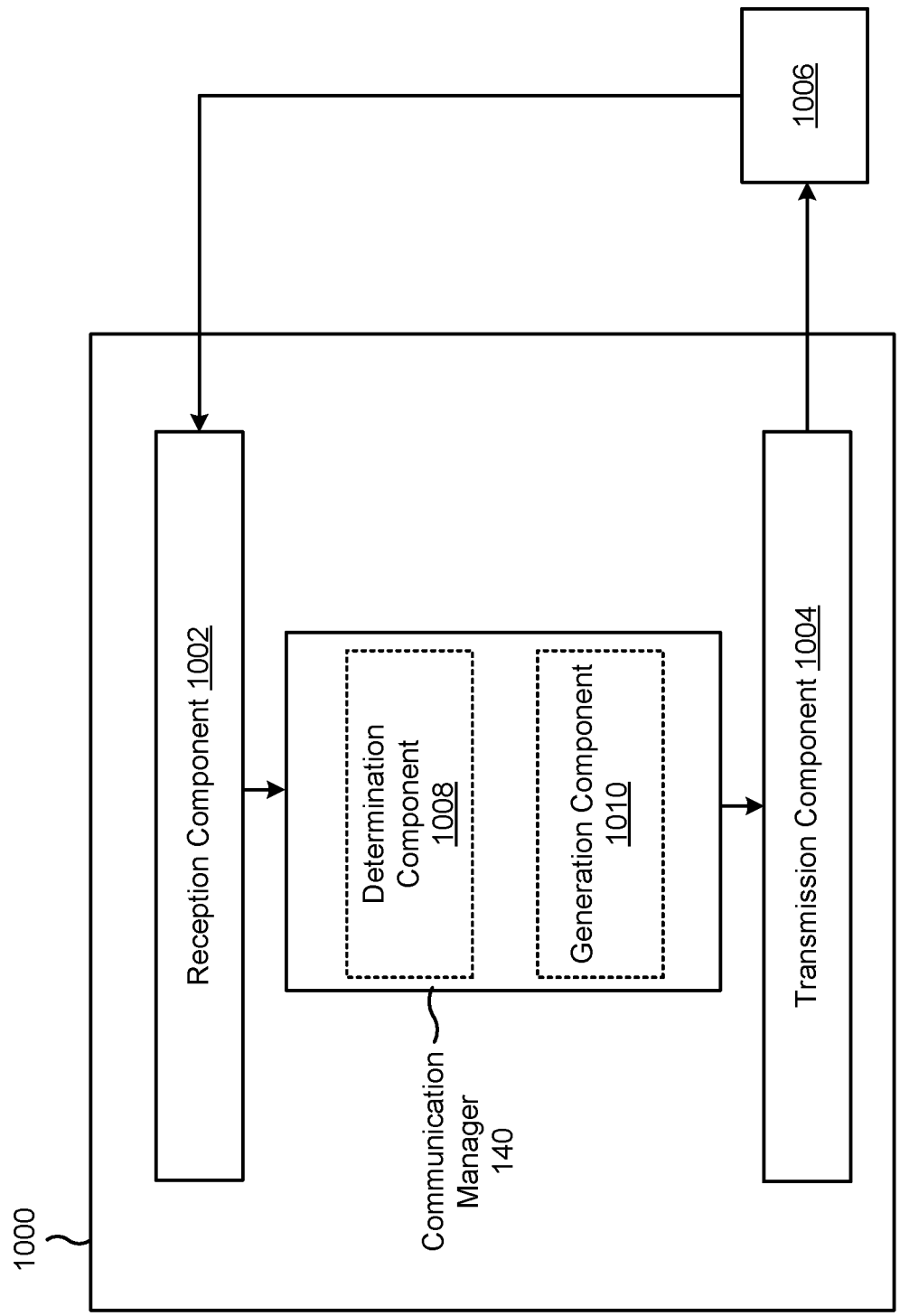

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a determination component 1008 and/or a generation component 1010, among other examples.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The determination component 1008 may determine an EIRP limit for a communication to be transmitted by the UE, based at least in part on an EIRP mask for the UE and a spatial angle associated with the communication. The transmission component 1004 may transmit the communication in accordance with the EIRP limit.

The reception component 1002 may receive, from a network node, an indication of the EIRP mask for the UE.

The generation component 1010 may generate the EIRP mask based at least in part on at least one of a location or an orientation of the UE.

The reception component 1002 may receive, from a network node, an indication of expected positions associated with one or more victim nodes.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a network node, comprising: determining an effective isotropic radiated power (EIRP) limit for a communication to be transmitted by the network node, based at least in part on an EIRP mask and a spatial angle associated with the communication; and transmitting the communication in accordance with the EIRP limit.

Aspect 2: The method of Aspect 1, wherein the EIRP mask includes spatial angle dependent EIRP limits for the network node.

Aspect 3: The method of Aspect 2, wherein the spatial angle dependent EIRP limits, included in the EIRP mask, include respective EIRP limits for a plurality of spatial angles, and wherein each spatial angle, of the plurality of spatial angles, corresponds to an azimuth angle and a zenith or elevation angle in a local coordinate system with respect to the network node.

Aspect 4: The method of any of Aspects 2-3, wherein the spatial angle dependent EIRP limits, included in the EIRP mask, include at least a first EIRP limit associated with a first set of spatial angles and a second EIRP limit associated with a second set of spatial angles.

Aspect 5: The method of any of Aspects 1-4, wherein the EIRP mask includes a respective frequency band dependent EIRP mask for each frequency band of a plurality of frequency bands associated with the network node.

Aspect 6: The method of Aspect 5, wherein determining the EIRP limit for the communication comprises: determining the EIRP limit for the communication based at least in part on the respective frequency band dependent EIRP mask for a frequency band, of the plurality of frequency bands associated with the network node, in which the communication is transmitted by the network node.

Aspect 7: The method of any of Aspects 1-6, further comprising: generating the EIRP mask.

Aspect 8: The method of Aspect 7, wherein generating the EIRP mask comprises: generating the EIRP mask based at least in part on a time at which the communication is to be transmitted.

Aspect 9: The method of Aspect 8, wherein generating the EIRP mask based at least in part on a time at which the communication is to be transmitted comprises: generating the EIRP mask based at least in part on expected positions associated with one or more victim nodes at the time at which the communication is to be transmitted.

Aspect 10: The method of Aspect 9, wherein the one or more victim nodes include one or more victim nodes associated with a satellite service or an unmanned aerial vehicle (UAV) service.

Aspect 11: The method of any of Aspects 1-10, wherein transmitting the communication in accordance with the EIRP limit comprises: transmitting the communication with an EIRP that satisfies the EIRP limit, wherein the EIRP for the communication is determined based at least in part on a hybrid beamforming codebook of beams used to transmit the communication.

Aspect 12: The method of any of Aspects 1-10, wherein transmitting the communication in accordance with the EIRP limit comprises: transmitting the communication with an EIRP that satisfies the EIRP limit, wherein the EIRP for the communication is determined based at least in part on electric and magnetic field properties of an antenna array used to transmit the communication.

Aspect 13: The method of any of Aspects 1-12, wherein the communication is a downlink communication transmitted to a user equipment (UE) in accordance with the EIRP limit.

Aspect 14: The method of any of Aspects 1-13, wherein determining the EIRP limit for the communication to be transmitted by the network node, based at least in part on the EIRP mask and the spatial angle associated with the communication, comprises: determining the EIRP limit for the communication based at least in part on the EIRP mask and a set of spatial angles associated with a main lobe of a beam to be used to transmit the communication.

Aspect 15: A method of wireless communication performed by a user equipment (UE), comprising: determining an effective isotropic radiated power (EIRP) limit for a communication to be transmitted by the UE, based at least in part on an EIRP mask for the UE and a spatial angle associated with the communication; and transmitting the communication in accordance with the EIRP limit.

Aspect 16: The method of Aspect 15, further comprising: receiving, from a network node, an indication of the EIRP mask for the UE.

Aspect 17: The method of Aspect 16, wherein the EIRP mask for the UE is based at least in part on at least one of a location or an orientation of the UE.

Aspect 18: The method of any of Aspects 16-17, wherein the indication of the EIRP mask for the UE is included in a radio resource control (RRC) message, a medium access control (MAC) control element (MAC-CE), or downlink control information (DCI).

Aspect 19: The method of any of Aspects 15-18, wherein the EIRP mask includes spatial angle dependent EIRP limits for the UE.

Aspect 20: The method of Aspect 19, wherein the spatial angle dependent EIRP limits, included in the EIRP mask, include respective EIRP limits for a plurality of spatial angles, and wherein each spatial angle, of the plurality of spatial angles, corresponds to an azimuth angle and a zenith or an elevation angle in a local coordinate system with respect to the UE.

Aspect 21: The method of any of Aspects 19-20, wherein the spatial angle dependent EIRP limits, included in the EIRP mask, include at least a first EIRP limit associated with a first set of spatial angles and a second EIRP limit associated with a second set of spatial angles.

Aspect 22: The method of any of Aspects 15-21, wherein the EIRP mask includes a respective frequency band dependent EIRP mask for each frequency band of a plurality of frequency bands associated with the UE.

Aspect 23: The method of Aspect 22, wherein determining the EIRP limit for the communication comprises: determining the EIRP limit for the communication based at least in part on the respective frequency band dependent EIRP mask for a frequency band, of the plurality of frequency bands associated with the UE, in which the communication is transmitted by the UE.

Aspect 24: The method of any of Aspects 15 and 18-23, further comprising: generating the EIRP mask based at least in part on at least one of a location or an orientation of the UE.

Aspect 25: The method of Aspect 24, further comprising: receiving, from a network node, an indication of expected positions associated with one or more victim nodes, wherein generating the EIRP mask based at least in part on at least one of the location or the orientation of the UE comprises generating the EIRP mask based at least in part on at least one of the location or the orientation of the UE and based at least in part on the expected positions associated with the one or more victim nodes.

Aspect 26: The method of Aspect 25, wherein the one or more victim nodes include one or more victim nodes associated with a satellite service or an unmanned aerial vehicle (UAV) service.

Aspect 27: The method of any of Aspects 15-26, wherein transmitting the communication in accordance with the EIRP limit comprises: transmitting the communication with an EIRP that satisfies the EIRP limit, wherein the EIRP for the communication is determined based at least in part on a hybrid beamforming codebook of beams used to transmit the communication.

Aspect 28: The method of any of Aspects 15-26, wherein transmitting the communication in accordance with the EIRP limit comprises: transmitting the communication with an EIRP that satisfies the EIRP limit, wherein the EIRP for the communication is determined based at least in part on electric and magnetic field properties of an antenna array used to transmit the communication.

Aspect 29: The method of any of Aspects 15-28, wherein the communication is an uplink communication transmitted to a network node in accordance with the EIRP limit or a sidelink communication transmitted to another UE in accordance with the EIRP limit.

Aspect 30: The method of any of Aspects 15-29, wherein determining the EIRP limit for the communication to be transmitted by the UE, based at least in part on the EIRP mask for the UE and the spatial angle associated with the communication, comprises: determining the EIRP limit for the communication based at least in part on the EIRP mask for the UE and a set of spatial angles associated with a main lobe of a beam to be used to transmit the communication.

Aspect 31: An apparatus for wireless communication at a device, comprising a processor; memory coupled with the processor; and instructions stored in the memory and executable by the processor to cause the apparatus to perform the method of one or more of Aspects 1-14.

Aspect 32: A device for wireless communication, comprising a memory and one or more processors coupled to the memory, the one or more processors configured to perform the method of one or more of Aspects 1-14.

Aspect 33: An apparatus for wireless communication, comprising at least one means for performing the method of one or more of Aspects 1-14.

Aspect 34: A non-transitory computer-readable medium storing code for wireless communication, the code comprising instructions executable by a processor to perform the method of one or more of Aspects 1-14.

Aspect 35: A non-transitory computer-readable medium storing a set of instructions for wireless communication, the set of instructions comprising one or more instructions that, when executed by one or more processors of a device, cause the device to perform the method of one or more of Aspects 1-14.

Aspect 36: An apparatus for wireless communication at a device, comprising a processor; memory coupled with the processor; and instructions stored in the memory and executable by the processor to cause the apparatus to perform the method of one or more of Aspects 15-30.

Aspect 37: A device for wireless communication, comprising a memory and one or more processors coupled to the memory, the one or more processors configured to perform the method of one or more of Aspects 15-30.

Aspect 38: An apparatus for wireless communication, comprising at least one means for performing the method of one or more of Aspects 15-30.

Aspect 39: A non-transitory computer-readable medium storing code for wireless communication, the code comprising instructions executable by a processor to perform the method of one or more of Aspects 15-30.

Aspect 40: A non-transitory computer-readable medium storing a set of instructions for wireless communication, the set of instructions comprising one or more instructions that, when executed by one or more processors of a device, cause the device to perform the method of one or more of Aspects 15-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
   one or more memories; and
   one or more processors, coupled to the one or more memories, configured to:
      determine an effective isotropic radiated power (EIRP) limit for a communication to be transmitted by the network node, based at least in part on an EIRP mask and a spatial angle associated with the communication, wherein at least one of:
         the EIRP mask includes spatial angle dependent EIRP limits, for the network node, that include respective EIRP limits for a plurality of spatial angles including the spatial angle, wherein each spatial angle, of the plurality of spatial angles, corresponds to an azimuth angle and a zenith or an elevation angle in a local coordinate system with respect to the network node, or
         the EIRP mask is based at least in part on a time at which the communication is to be transmitted; and
      transmit the communication in accordance with the EIRP limit.

2. The network node of claim 1, wherein the EIRP mask includes the spatial angle dependent EIRP limits for the network node.

3. The network node of claim 2,
   wherein the spatial angle dependent EIRP limits include the respective EIRP limits for the plurality of spatial angles, wherein each spatial angle, of the plurality of spatial angles, corresponds to the azimuth angle and the zenith or the elevation angle.

4. The network node of claim 1,
   wherein the respective EIRP limits include at least a first EIRP limit, associated with a first set of spatial angles of the plurality of spatial angles, and a second EIRP limit associated with a second set of spatial angles of the plurality of spatial angles.

5. The network node of claim 1,
wherein the EIRP mask includes a respective frequency band dependent EIRP mask for each frequency band of a plurality of frequency bands associated with the network node.

6. The network node of claim 5,
wherein the one or more processors, to determine the EIRP limit for the communication, are configured to:
determine the EIRP limit for the communication based at least in part on the respective frequency band dependent EIRP mask for a frequency band, of the plurality of frequency bands associated with the network node, in which the communication is transmitted by the network node.

7. The network node of claim 1,
wherein the one or more processors are further configured to:
generate the EIRP mask.

8. The network node of claim 1,
wherein the EIRP mask is based at least in part on the time at which the communication is to be transmitted.

9. The network node of claim 8,
wherein the EIRP mask is based at least in part on expected positions associated with one or more victim nodes at the time at which the communication is to be transmitted.

10. The network node of claim 9,
wherein the one or more victim nodes include one or more victim nodes associated with a satellite service or an unmanned aerial vehicle (UAV) service.

11. The network node of claim 1,
wherein the one or more processors, to transmit the communication in accordance with the EIRP limit, are configured to:
transmit the communication with an EIRP that satisfies the EIRP limit, wherein the EIRP for the communication is determined based at least in part on a hybrid beamforming codebook of beams used to transmit the communication.

12. The network node of claim 1,
wherein the one or more processors, to transmit the communication in accordance with the EIRP limit, are configured to:
transmit the communication with an EIRP that satisfies the EIRP limit, wherein the EIRP for the communication is determined based at least in part on electric and magnetic field properties of an antenna array used to transmit the communication.

13. The network node of claim 1,
wherein the one or more processors, to determine the EIRP limit for the communication, are configured to:
determine the EIRP limit for the communication based at least in part on the EIRP mask and a set of spatial angles, of the plurality of spatial angles and including the spatial angle, associated with a main lobe of a beam to be used to transmit the communication.

14. A user equipment (UE) for wireless communication, comprising:
one or more memories; and
one or more processors, coupled to the one or more memories, configured to:
determine an effective isotropic radiated power (EIRP) limit for a communication to be transmitted by the UE, based at least in part on an EIRP mask for the UE and a spatial angle associated with the communication, wherein at least one of:
the EIRP mask includes spatial angle dependent EIRP limits, for the UE, that include respective EIRP limits for a plurality of spatial angles including the spatial angle, wherein each spatial angle, of the plurality of spatial angles, corresponds to an azimuth angle and a zenith or an elevation angle in a local coordinate system with respect to the UE, or
the EIRP mask is based at least in part on a time at which the communication is to be transmitted; and
transmit the communication in accordance with the EIRP limit.

15. The UE of claim 14,
wherein the one or more processors are further configured to:
receive, from a network node, an indication of the EIRP mask for the UE.

16. The UE of claim 15,
wherein the EIRP mask for the UE is based at least in part on at least one of a location or an orientation of the UE.

17. The UE of claim 14, wherein the EIRP mask includes the spatial angle dependent EIRP limits for the UE.

18. The UE of claim 17,
wherein the spatial angle dependent EIRP limits include the respective EIRP limits for the plurality of spatial angles, wherein each spatial angle, of the plurality of spatial angles, corresponds to the azimuth angle and the zenith or the elevation angle.

19. The UE of claim 17,
wherein the respective EIRP limits include at least a first EIRP limit, associated with a first set of spatial angles of the plurality of spatial angles, and a second EIRP limit associated with a second set of spatial angles of the plurality of spatial angles.

20. The UE of claim 14,
wherein the EIRP mask includes a respective frequency band dependent EIRP mask for each frequency band of a plurality of frequency bands associated with the UE.

21. The UE of claim 20,
wherein the one or more processors, to determine the EIRP limit for the communication, are configured to:
determine the EIRP limit for the communication based at least in part on the respective frequency band dependent EIRP mask for a frequency band, of the plurality of frequency bands associated with the UE, in which the communication is transmitted by the UE.

22. The UE of claim 14,
wherein the one or more processors, to determine the EIRP limit for the communication, are configured to:
determine the EIRP limit for the communication based at least in part on the EIRP mask and a set of spatial angles, of the plurality of spatial angles and including the spatial angle, associated with a main lobe of a beam to be used to transmit the communication.

23. A method of wireless communication performed by a network node, comprising:
determining an effective isotropic radiated power (EIRP) limit for a communication to be transmitted by the network node, based at least in part on an EIRP mask and a spatial angle associated with the communication, wherein at least one of:
the EIRP mask includes spatial angle dependent EIRP limits, for the network node, that include respective EIRP limits for a plurality of spatial angles including the spatial angle, wherein each spatial angle, of the plurality of spatial angles, corresponds to an azimuth angle and a zenith or elevation angle in a local coordinate system with respect to the network node, or the EIRP mask is based at least in part on a time at which the communication is to be transmitted; and transmitting the communication in accordance with the EIRP limit.

24. The method of claim 23, wherein the EIRP mask includes the spatial angle dependent EIRP limits for the network node.

25. The method of claim 23,
wherein the EIRP mask includes a respective frequency band dependent EIRP mask for each frequency band of a plurality of frequency bands associated with the network node.

26. The method of claim 23, further comprising:
generating the EIRP mask.

27. The method of claim 23,
wherein the EIRP mask is based at least in part on expected positions associated with one or more victim nodes at the time at which the communication is to be transmitted.

28. A method of wireless communication performed by a user equipment (UE), comprising:
determining an effective isotropic radiated power (EIRP) limit for a communication to be transmitted by the UE, based at least in part on an EIRP mask for the UE and a spatial angle associated with the communication, wherein at least one of:

the EIRP mask includes spatial angle dependent EIRP limits, for the UE, that include respective EIRP limits for a plurality of spatial angles including the spatial angle, wherein each spatial angle, of the plurality of spatial angles, corresponds to an azimuth angle and a zenith or an elevation angle in a local coordinate system with respect to the UE, or the EIRP mask is based at least in part on a time at which the communication is to be transmitted; and transmitting the communication in accordance with the EIRP limit.

29. The method of claim 28, further comprising:
receiving, from a network node, an indication of the EIRP mask for the UE.

30. The method of claim 28,
wherein the EIRP mask includes the spatial angle dependent EIRP limits for the UE.

* * * * *